United States Patent [19]
Davis

[11] Patent Number: 5,477,090
[45] Date of Patent: Dec. 19, 1995

[54] AUTO ANTI-THEFT DEVICE

[76] Inventor: Curtis E. Davis, 1462 E. Tamassee Dr., Seneca, S.C. 29678-8951

[21] Appl. No.: 145,243

[22] Filed: Nov. 3, 1993

[51] Int. Cl.$^6$ ............................ B60R 25/04; E05B 65/19
[52] U.S. Cl. ........................ 307/10.1; 70/241; 180/287; 307/10.5; 340/825.69
[58] Field of Search ................................ 307/9.1–10.7, 307/150; 361/182–183; 70/237, 240, 241; 180/271, 287, 289; 280/151; 320/2, 5, 11, 14; 322/60; 429/163, 178, 179; 340/426, 430, 539, 825.31, 825.32, 825.34, 825.44, 825.45, 825.69, 825.72, 825.54; 439/503, 504, 522, 754

[56] References Cited

U.S. PATENT DOCUMENTS

| | | | |
|---|---|---|---|
| 1,856,391 | 5/1932 | Keppler | 70/241 |
| 3,466,453 | 9/1969 | Greenberg | 307/10.1 |
| 3,548,373 | 12/1970 | Rivera et al. | 70/241 |
| 3,731,963 | 5/1973 | Pond | 70/241 |
| 3,820,361 | 6/1974 | Leitner | 180/289 |
| 4,102,164 | 7/1978 | Barbush | 70/241 |
| 4,595,903 | 6/1986 | Arlasky et al. | 307/10.3 |
| 4,607,312 | 8/1986 | Barreto-Mercado | 307/10.4 |
| 4,805,722 | 2/1989 | Keating et al. | 307/10.5 |
| 4,829,223 | 5/1989 | Broberg et al. | 320/2 |
| 4,887,064 | 12/1989 | Drori et al. | 340/426 |
| 4,904,993 | 2/1990 | Sato | 340/825.69 |
| 4,932,896 | 6/1990 | Julian | 439/504 |
| 4,987,406 | 1/1991 | Reid | 340/539 |
| 5,013,259 | 5/1991 | Maurer | 439/522 |
| 5,124,565 | 6/1992 | Yoshida | 307/9.1 |
| 5,132,660 | 7/1992 | Chen | 340/428 |
| 5,184,023 | 2/1993 | Carlo | 307/10.3 |
| 5,361,612 | 11/1994 | Voiculescu et al. | 70/241 |
| 5,396,216 | 3/1995 | Morgan | 307/10.3 |

Primary Examiner—William M. Shoop, Jr.
Assistant Examiner—Richard T. Elms
Attorney, Agent, or Firm—Henry S. Jaudon; Cort Flint

[57] ABSTRACT

A device for disabling a motor vehicle having an engine, an engine compartment, a hood, a primary circuit enabling the operation of the engine and a power source. The device includes a remote receiver having a pair of remote controlled switches which are controlled between contact and open positions by a remote transmitter. The device connects one of the switches with a primary circuit with the switch normally in a contact position maintaining the power circuit normally complete. A secondary electrical circuit which controls electrically actuated hood locks is also provided. Second switches of the remote receiver are connected in the secondary circuit with the second switches being normally open which maintains the secondary circuit normally broken. A remote transmitter which when actuated causes the remote receiver to move the first switch to an open position breaking the primary circuit and disabling the engine and to move the second switch to a closed position enabling the secondary circuit to activate the hood locks to lock the closed hood.

15 Claims, 5 Drawing Sheets

AUTO ANTI-THEFT DEVICE

BACKGROUND OF THE INVENTION

The instant invention is directed to an anti-theft device for use with motor vehicles.

The provision of anti-theft devices for motor vehicles is well known. The known devices have various short comings which reduce their effectiveness and/or market acceptance. A primary drawback to known devices is that while they may initially prevent or deter vehicle theft, they can easily be bypassed because the circuitry of the vehicle is accessible. Another drawback is the cost of insulation and another is the complexity of operation of the device.

Examples of known anti-theft devices are disclosed in U.S. Pat. Nos. 4,595,903; 5,132,660; and 5,184,023. In U.S. Pat. No. 4,595,903 the anti-theft apparatus consists of a control head, a cable assembly and an underhood latch switch control assembly. A lock advances the cable to move lock bolt into hood locking engagement and also activates the starter deactivating switch. This is a manual device accessibly mounted under the dash board. The arrangement is intended for parked vehicles only. U.S. Pat. No. 5,184,023 is an binary controlled attachment device connected with the battery terminals. The device may be easily bypassed. U.S. Pat. No. 5,132,660 is a binary controlled attachment which renders the ignition switch inoperative. Again the arrangement can be easily bypassed. Also, none of the electrical devices offer back-up arrangements.

It is an object of the invention to provide an anti-theft device which incorporates the power circuit of the engine of a motor vehicle and simultaneously provides protection against the possibility of being bypassed.

Another object of the invention is to provide an anti-theft device having alternative controls to insure against malfunctions.

Another object of the invention is to provide an anti-theft device in which the starter and/or engine may be deactivated.

Another object of the invention is to provide an anti-theft device structure having a safety circuit by which the battery may be charged or provided with auxiliary power with the hood locked closed.

Another object of the invention is to provide an anti-theft device which is easily installed and maintained.

SUMMARY OF THE INVENTION

The invention is directed to an anti-theft device for use with motor vehicles. The device is operative to disable at least portions of the electrical power circuit of the engine of the vehicle, thus disabling the engine. Also the device is operative to enable a second circuit which activates hood lock members to lock the hood in the closed position.

A remote receiver having a plurality of switches, which are controlled by a single remote transmitter, is secured within the engine compartment. One of the switches is normally positioned in its closed position. This switch is incorporated into the power circuit and connected in line with the starter, the rotor or other components essential to starting or operation of the engine. A second switch, which normally remains in the open position is assembled into the second circuit which is associated with the hood locks. Because the second switch is normally open, the second circuit is interrupted with the hood locks are normally inactive.

Actuation of the remote transmitter causes the switches of the remote receiver to reverse positions. The first switch moves to its open position, breaking the power circuit and disabling the engine. The second switch closes to complete the second circuit which activates the hood lock members to lock the hood in position.

The device includes a second remote receiver operated by a second remote transmitter in the same manner as the first remote receiver and transmitter. The second remote receiver is intended as a back-up should the first remote receiver become disabled while in its disabling position.

The second remote receiver also includes a plurality of switches and is operated by a second remote transmitter. A first of these switches is normally open and is incorporated in the power circuit. A second of these switches is normally closed and is incorporated in the second circuit. Activation of the second remote receiver causes the switches to simultaneously reverse positions, which reestablishes the power circuit to allow normal operation of the engine and disables the second circuit which deactivates the hood lock members.

The lock members comprises a pair of solenoids each having a reciprocal core. Normally the cores are withdrawn and in an inoperative position. Energizing the solenoids causes the cores to move to an extended position. The cores in the extended position engage with opposite sides of the hood to lock it in the closed position.

In an alternative arrangement, the anti-theft device includes a remote receiver having a plurality of switches which are controlled by a single remote transmitter. The remote receiver is secured within the engine compartment. One of the switches is normally position in its closed position. This switch is incorporated into the power circuit and connected in line with the starter, the rotor or other components essential to starting or operation of the engine. A second switch, which is also normally in the closed position is assembled into the second circuit which is associated with the hood locks. Because the first and second switches are normally closed, the first circuit is conditioned to allow the engine to operate and the second circuit is conditioned to actuate the hood locks to have their hood engaging members urged into a withdrawn position in which the hood is not locked down.

Actuation of the remote transmitter causes the switches of the remote receiver to reverse positions. The first switch moves to its open position, breaking the power circuit and disabling the engine. The second switch opens to break the second circuit which deactivates the hood locks. Spring members then move the engaging members of the hood locks into locking position to lock the hood down.

The device includes a second remote receiver operated by a second remote transmitter in the same manner as the first remote receiver and transmitter. The second remote receiver is intended as a back-up should the first remote receiver become disabled while in its disabling position.

The lock members comprises a pair of solenoids each having a reciprocal core. Normally the cores are spring urged into an extended or locking position. Energizing the solenoids causes the cores to move to a withdrawn position. The cores in the extended position engage with opposite sides of the hood to lock it in the closed position.

The main power source comprises a DC battery. A third circuit which includes power leads is connected with the battery. The leads are mounted on an exterior surface of the vehicle, such as in a wheel well, and may be used to supply electrical power to the battery should it lose power while the vehicle is disable.

The construction designed to carry out the invention will hereinafter be described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Figure 1:
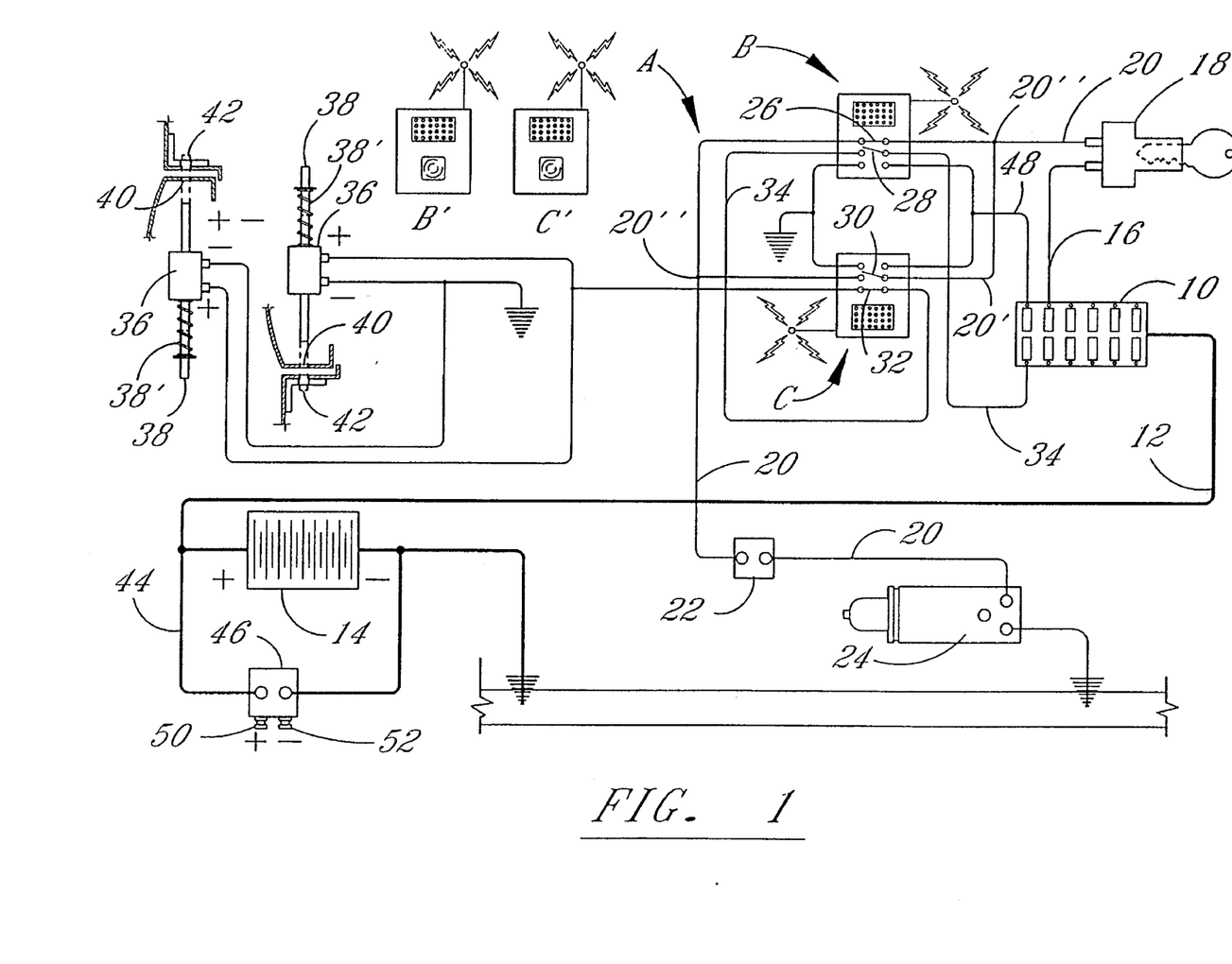
FIG. 1 is a schematic view showing a partial section of an automobile circuit equipped with the anti-theft device of the invention.

Turning now to the drawings, FIG. 1 shows a vehicle security system A incorporated with a portion of the wiring system of the vehicle as shown. The arrangement includes a power panel 10 which is supplied via lead 12 from battery 14. Lead 16 from power panel 10 connects with power switch 18 which is of the usual type. Lead 20 coming from switch 18 passes through remote receiver B, through starter relay 22 and is connected with starter 24.

Remote receiver B, as shown, contains two flip flop switches 26 and 28 which are controlled by a remote transmitter B' to simultaneously reverse or switch positions. Remote receiver B is powered from battery 14 through power board 10 and lead 48 as shown in the drawing. There are thousands of codes available to code the remote transmitters and receivers so that each transmitter is essentially operative only with its associated receiver. Remote receiver B may be one of any number of commercially available units and forms no part of the invention. Suitable remote receivers and transmitters are Model AU-REC-2T or AU-REC-2TLC sold by Excaliber of Douglasville, Ga.

Switch 26 is connected with lead 20. Switch 26 is arranged to normally be in the closed position, as shown, which completes the circuit to starter 24.

A second remote receiver C, also powered through lead 48, is preferably the same model as remote receiver B but is controlled with a different control frequency. Remote receiver C contains a pair of flip flop switches 30 and 32 which are controlled by remote transmitter C' to simultaneously move into reverse positions. Switch 30 is arranged to normally be in an open position and switch 32 is arranged to normally be in a closed position as shown in the drawing. Remote transmitter and receiver C, C' are coded to a different code than remote transmitters and receivers B, B'.

Lead 20' connects with lead 20 at spaced points 20" which are on opposite sides of remote receiver B. Switch 30 connects with lead 20' but because switch 30 is normally open, lead 20' is normally broken and inactive.

The circuit formed by leads 16, 20 and 20' is referred to as the primary circuit.

A secondary circuit is formed by lead 34 which is connected with power panel 10 and with a pair of solenoids 36. Each of the solenoids 36 is formed to have a core 38 which is urged into a retracted position by spring members 38' when the solenoids are inactive. Solenoids 36 are secured to opposite wall portions of the engine compartment of a vehicle. The solenoids are positioned with cores 38 in alignment with apertures 42 formed in the hood and 40 formed in the side walls of the engine compartment. It is noted that other types of electrical locking devices may be used within the scope of the invention.

Figure 5:
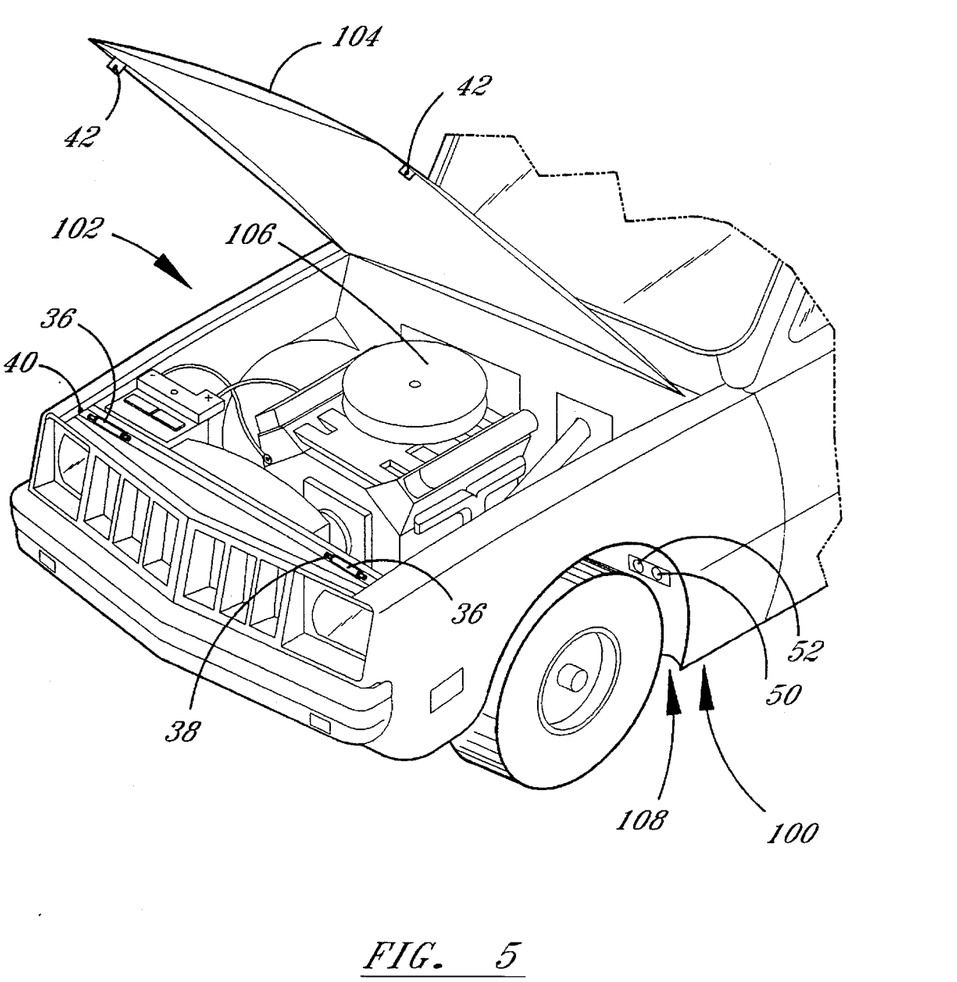
FIG. 5 is a partial pictorial view illustrating the invention as mounted in the wheel well and engine compartment of a motor vehicle.

FIG. 5 shows a section of motor vehicle 100 having an engine compartment 102 which houses engine 106. Hood 104 is arranged in the usual manner to have an open position as shown and a closed position in which the engine is substantially entombed.

Hood 104 is provided with opposed edge portions in which apertures 42 are formed. Apertures 40 are formed in the sidewalls of engine compartment 102 and are aligned with apertures 42 when hood 104 is in the closed position. Solenoids 36 are arranged as shown with core 38 aligned with apertures 40, 42.

While the preferred embodiment discloses a pair of electrically controlled lock members arranged at opposite edges of the hood, it is understood that any number of lock members deemed to be necessary may be employed.

Switch 28 of remote receiver B, which is normally open, is connected in lead 34 which then passes to switch 32 of remote receiver C. Switch 32 is normally closed. From switch 32, lead 34 is connected with solenoids 36. Because switch 28 is normally open the secondary circuit is usually broken and solenoids 36 are normally inactive.

When the vehicle operator decides to deactivate the engine, remote transmitter B' is simply activated to cause remote receiver B to reverse the positions of switches 26, 28. This breaks the circuit formed by leads 16, 20 and 20' at switch 26 and incapacitates starter 24 which deactivates the engine.

Simultaneously the circuit formed by lead 34 is completed and solenoids 36 are activated to move cores 38 from their normal rest position into apertures 40, 42 which locks the hood down with the side walls of the vehicle.

Should a prospective thief jump the circuit at starter switch 18, there will be no response from starter 24 as the main circuit remains broken at switch 26. Because the hood is locked down by cores 38, the prospective thief cannot access the circuit and bypass anti-theft device A.

Should remote receiver B become incapacitated or malfunction while in the anti-theft position, the operator switches to remote transmitter C' to operate remote receiver C. When remote transmitter C' is activated, switches 30, 32 reverse the positions shown in FIG. 1 so that switch 30 closes to complete primary circuit 16, 20, 20' and enable the engine while switch 32 is moved to its open position which breaks the secondary circuit formed by lead 34 and deactivates solenoids 36. Resilient members 38' urge cores 38 into their retracted position which unlocks the hood from the side wall.

An additional safety arrangement is provided in the form of lead 44 which connects with the positive (+) and negative (−) poles of battery and includes housing 46 which is provided with positive (+) and negative (−) poles 50, 52. Housing 46 is adapted to be secured to an exterior surface of the vehicle, preferably under a wheel well. Alternatively, housing 46 could be mounted in the trunk of the vehicle. In the event that battery 14 becomes incapacitated or loses power with safety device A activated, a jumper cable may be attached with poles 50, 52 and alternative power provided to deactivate device A so that the engine may be accessed or started.

FIG. 5 shows wheel well 108 which is an acceptable exterior surface for mounting poles 50, 51.

Figure 2:
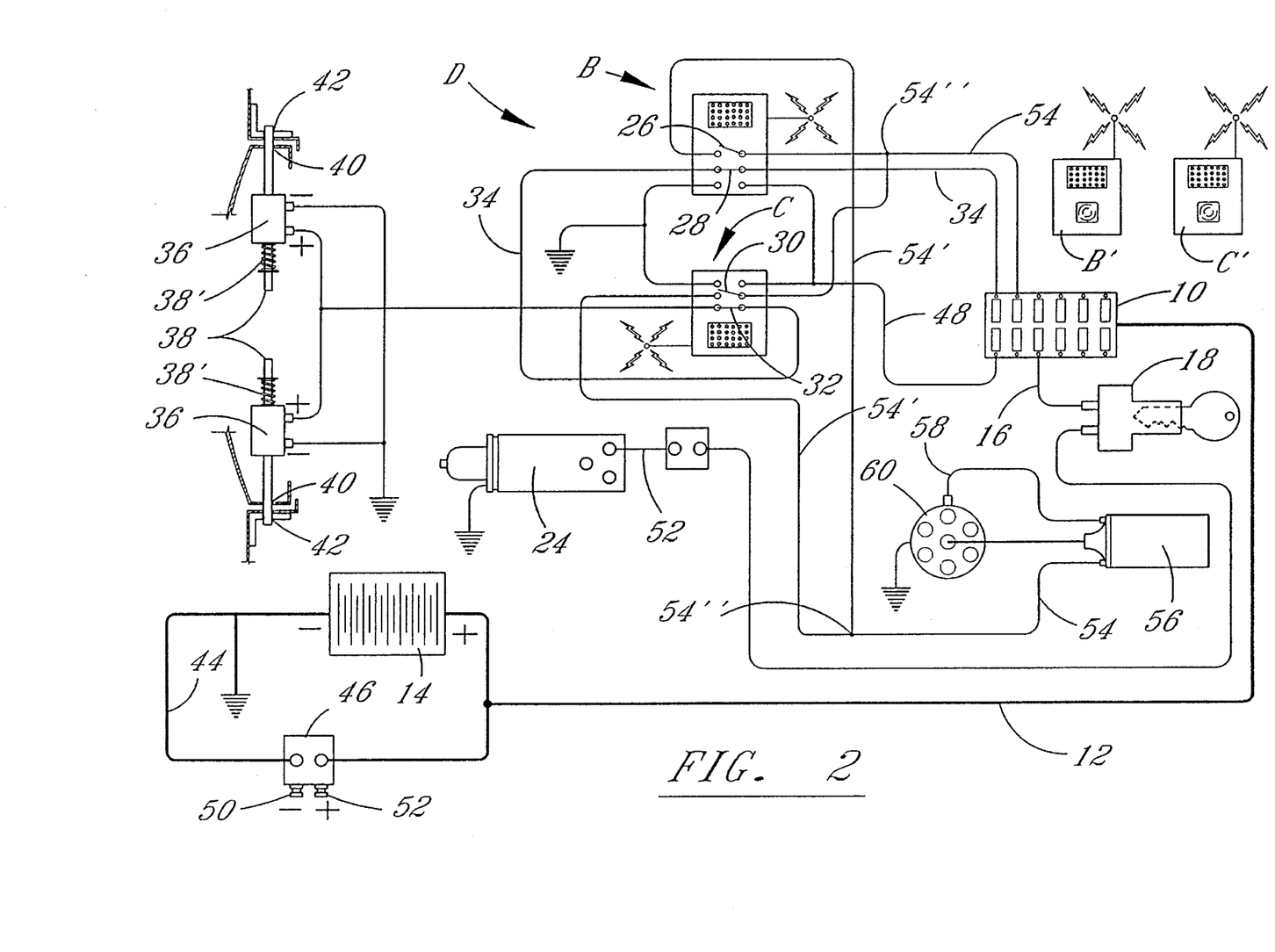
FIG. 2 is a schematic view showing a partial section of an automobile circuit equipped with an alternative arrangement of the anti-theft device of the invention.

FIG. 2 shows an alternative arrangement in which anti-theft D is in the activated position. In this arrangement starter 24 is connected with power panel 10 by lead 52, switch 18 and lead 16 in the usual manner. The primary circuit of this alternative arrangement is formed with lead 54 connected to the power panel 10 and with switch 26 of remote receiver B, coil 56 and distributor 60. Lead 54' connects with lead 54 at 54" on opposite sides of remote receiver B and connects with switch 30 of remote receiver C completing the primary circuit.

Switch 26 of remote receiver B, is normally closed, and switch 30 of remote receiver C is normally open.

The secondary circuit remains as described in the earlier embodiment with switch 28 of remote receiver B being normally open and switch 32 of remote receiver C being normally closed. Solenoids 36 act to lock the hood closed when anti-theft device D is activated as shown in the drawing.

With anti-theft device D in its anti-theft position switch 26 is in its open position and switch 28 is in its closed position as shown in the drawing. The secondary circuit, as in the previously described embodiment, activates solenoids 36 to lock the hood down. With the primary circuit broken at switch 26, delivery of power to coil 56 and distributor 60 is prevented and the engine is incapacitated. Solenoids 36 maintain the hood locked down preventing access to the circuitry as previously described.

Anti-theft device D is deactivated by actuating remote transmitter B' to cause remote receiver B to move switch 26 to its closed position and switch 28 to its open position. Closing switch 26 enables the primary circuit and opening switch 28 disables the secondary circuit in similar manner as described for primary embodiment A. Anti-theft device D also includes back-up systems C, C' and 44, 46, each of which functions as described in the primary embodiment.

Figure 3:
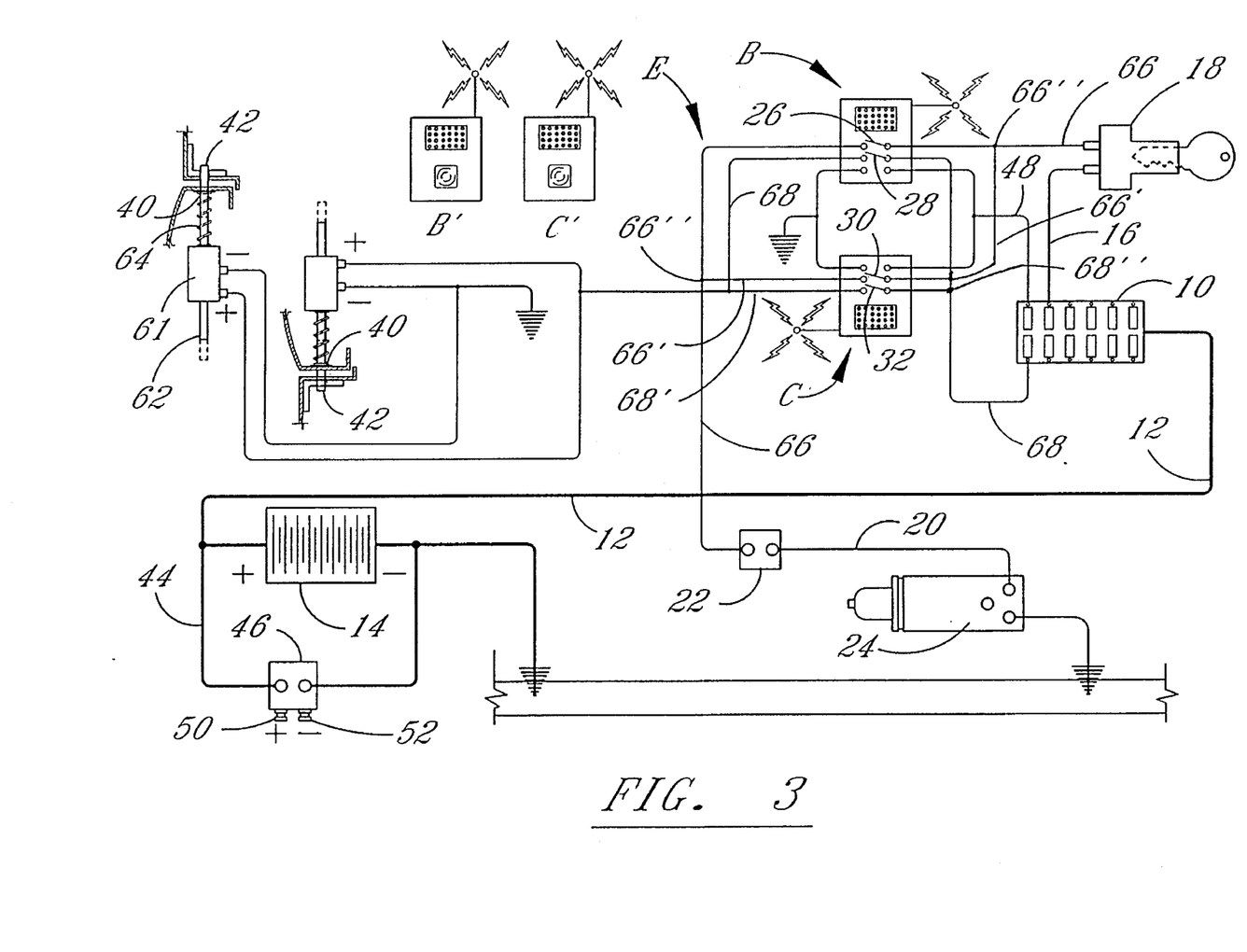
FIG. 3 is a schematic view showing a partial section of an automobile circuit equipped with a second alternative arrangement of the anti-theft device of the invention.

FIG. 3 shows a second alternative arrangement in which the anti-theft device E is in the activated position. In this arrangement, remote receivers B and C are arranged with switches 26, 28, 30 and 32 all in the open position and anti-theft device E is in activated position and the engine is disabled.

As in the previous arrangements, remote receiver B includes switches 26, 28 and remote receiver C contains switches 30, 32. Switch 26 is connected in a main circuit which includes lead 16 coming from power panel 10 and connecting with switch 18. Lead 66 connects with switch 26, which is normally closed, and then with relay 22 and starter 24. Switch 26 is normally closed.

An alternative lead 66' connects with switch 30 of remote receiver C, and with lead 66 at 66" and on to starter 24 via relay 22. Switch 30 is normally open.

Lead 68 of the secondary circuit comes from power panel 10 and is connected with switch 28 of remote receiver B and then with solenoids 61. Switch 28 is normally closed.

Alternative switch 32 is connected with lead 68 which connects with lead 68' at 66" and then with solenoids 61. Switch 32 is normally open.

Solenoids 61 include core 62 which is urged by spring 64 into an extended locking position in which it extends through openings 40, 42 formed in the side walls of the engine compartment and the hood respectively. When the solenoids 61 are activated, core 62 is drawn into a retracted position in which the hood is not locked down.

With switches 26, 28 in their normally closed position, the main circuit 16, 66, 66' is complete so that the engine is enabled and the hood is not locked down by solenoids 61.

Activation of remote receiver B' causes switches 26, 28 to open. This breaks the main circuit which disables starter 24 so as to disable the engine. The secondary circuit 28, 68 is also broken which allows springs 64 to urge core 62 to its extended position through openings 40, 42 to lock the hood down.

In the event that remote receiver B becomes inoperative in this position, remote receiver C may be activated to move switches 30, 32 from their normally open position to a closed position which completes both the main circuit and the secondary circuit. This enables the starter and releases the hood locks.

Figure 4:
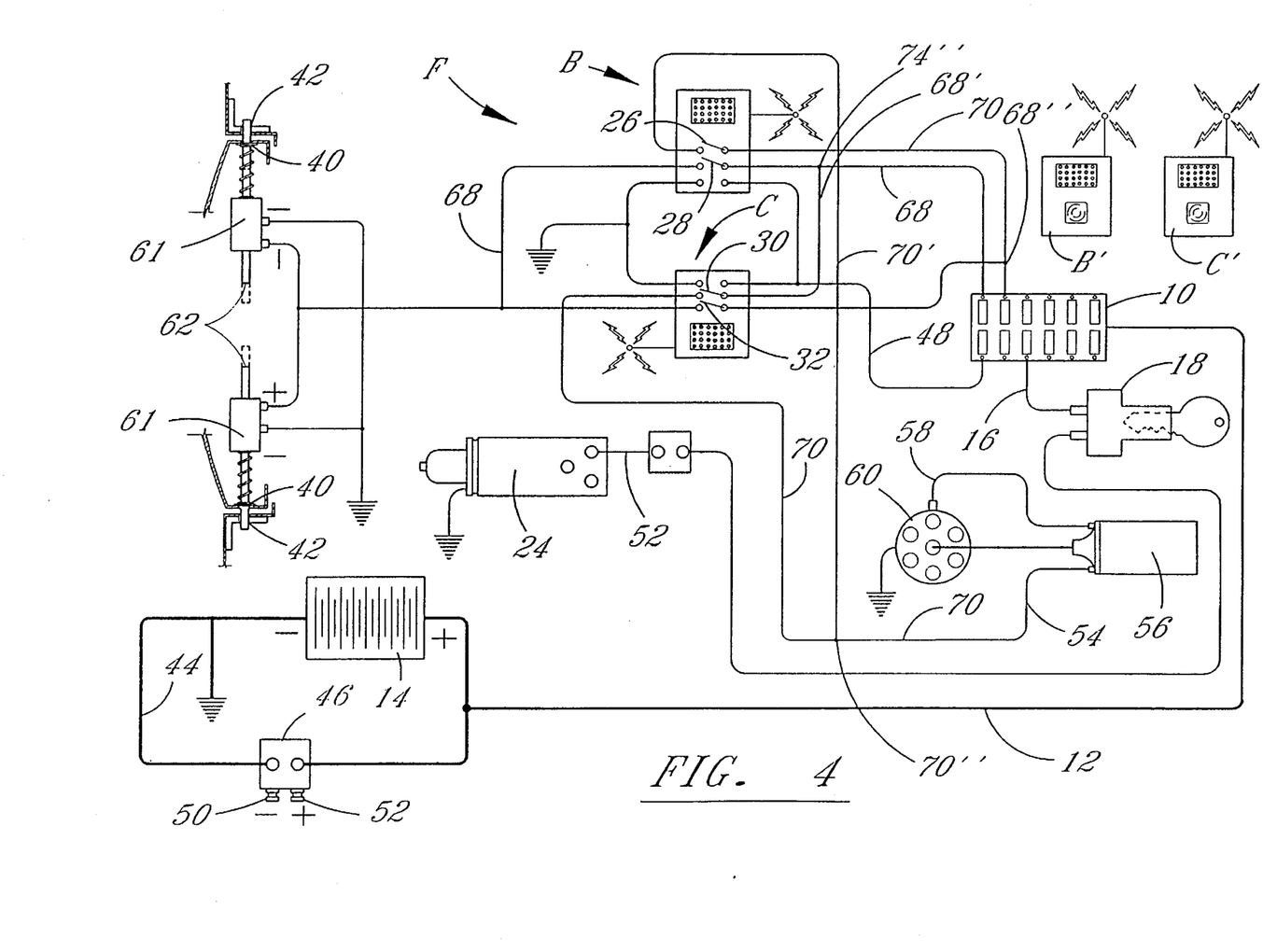
FIG. 4 is a schematic view showing a partial section of an automobile circuit equipped with a third alternative arrangement of the anti-theft device of the invention.

A fourth embodiment F is shown in FIG. 4. In this embodiment switches 26, 28 of remote receiver B are normally closed and switches 30, 32 of remote receiver C are normally open as in the embodiment E. Switches 28, 32 are connected with the secondary circuit 68 and control solenoids 61 as in embodiment E.

Switches 26 and 30 are connected with primary circuit 70, 70' which powers coil 56 and distributor 60. With switch 26 closed, the main circuit is complete so that both coil 56 and distributor 60 are operative and the engine is enabled. When switch 26 is opened by remote transmitter B' the main circuit is broken which disables coil 56 and distributor 60 and thereby disables the engine.

The secondary circuit 68, 68' which connects with solenoids 61 operates as discussed in the description of embodiment E.

Also, switches 30 and 32 of the remote receiver C are connected with the main and secondary circuits respectively as in embodiment E. In the event that remote receiver B becomes disabled with switches 26, 28 open, remote receiver C may be activated to close switches 30, 32 to complete the main and secondary circuits which unlocks the hood and enables the engine.

Both embodiments E and F also include outside terminals 50, 52 connected with battery 14 as in embodiments A and D.

Another alternative arrangement of the invention would be to provide remote receivers B and C with three or more switches. In this arrangement both primary circuits are as described for devices A and D or E and F, but are connected with a single remote receiver with each having the capability of disabling the engine when activated. The hood lock arrangement would remain unchanged.

While a preferred embodiment of the invention has been described using specific terms, such description is for illustrative purposes only, and it is to be understood that changes and variations may be made without departing from the spirit or scope of the following claims.

What is claimed is:

1. An anti-theft device for motor vehicles having an ignition switch, an engine, an engine compartment, a hood a primary circuit operative to enable engine operation and a secondary circuit operative to control a hood lock, said device comprising:

an electrical power source connected with said primary circuit and said secondary circuit;

a first remote receiver having at least a first switch arranged in said primary circuit and a second switch arranged in said secondary circuit and a remote transmitter operative to cause said switches to simultaneously reverse positions;

said hood lock being arranged in said engine compartment and being operative between a primary disengaged position and a secondary engaged position;

said first remote receiver having an active position in which said first switch is closed and said second switch is open, said active position conditioning said primary circuit to allow normal engine functions and secondary circuit to prevent activation of said hood lock from its primary disengaged position;

said first remote receiver having an inactive position in which said first switch is open and said second switch is closed, said inactive position conditioning said primary circuit to prevent normal engine operation and said secondary circuit to activate said hood lock from its disengaged position into an engaged position; whereby, activation of said first remote receiver by said remote transmitter simultaneously moves said first remote receiver from said active position into said inactive position incapacitating said engine and locking said hood closed; and a second remote receiver arranged in said primary and secondary circuits, said second remote receiver having an inactive position in which a first switch is open and a second switch is closed, said first switch being arranged in said primary circuit and, said second switch being arranged in said secondary circuit and a second remote transmitter operative to cause said second remote receiver to move from said inactive position into an active position in which said first switch is closed and said second switch is open; whereby, should said first remote receiver become disabled in said inactive position, said second remote receiver may be moved from said inactive position into said active position completing said primary circuit and incapacitating said secondary circuit.

2. The device according to claim 1 wherein said motor vehicle includes a distributor, said distributor being connected with said primary circuit; whereby, activation of said remote receiver deactivates said primary circuit which disables said distributor.

3. The device according to claim 1 wherein said electrical lock means comprises a pair of solenoids, each said solenoid having a core, said cores being in withdrawn position when said solenoids are inactive and being in an extended locking position when said solenoids are activated.

4. The device of claim 3 wherein said solenoids are mounted with said cores in position to engage opposite side edges of said hood.

5. The device of claim 1 wherein said power source includes a DC battery, a third circuit, having positive and negative poles connected with negative and positive poles of said battery, said poles of said third circuit being mounted on an exterior surface of said vehicle.

6. The device of claim 5 wherein said poles of said third circuit are mounted in a wheel well.

7. A method of disabling a motor vehicle having an engine, an engine compartment, a hood, a primary circuit enabling operation of said engine and a power source, the method including:

providing a first remote receiver having a pair of remote controlled switches which are controlled between contact and open positions by a remote transmitter;

connecting a first of said switches in said primary circuit with said switch normally in said contact position maintaining said primary circuit normally complete;

providing a secondary electrical circuit and connecting electrically actuated hood locks in said secondary circuit;

connecting a second of said switches in said secondary circuit with said second switch being positioned to normally maintain said hood locks in a disengaged position;

actuating said remote transmitter to automatically simultaneously cause said remote receiver to move said first switch to said open position breaking said primary circuit and disabling said engine and to move said second switch to a position enabling said hood locks to lock closed said hood; and, providing a third electrical circuit connected with said power source and including a pair of poles mounted on the exterior of said vehicle, said third electrical circuit being operative to deliver alternative electrical power to said power source.

8. The method of claim 7 including providing a back-up remote receiver operative to function to bypass said first remote receiver should it become disabled.

9. An anti-theft device for motor vehicles having a distributor, an engine, an engine compartment, a hood and a primary circuit operative to enable engine operation, said device comprising:

an electrical power source connected with said primary circuit and said distributor;

a remote receiver located in said engine compartment having at least a first normally closed switch and a second normally closed switch and a remote transmitter operative to cause said switches to simultaneously reverse positions;

an electrically controlled hood lock arranged within said engine compartment, said lock being operative between a primary engaged position and a secondary disengaged position;

a secondary circuit connected with said electrical power source and said electrical hood lock;

said first switch of said remote receiver being arranged in said primary circuit and operative when closed to complete said primary circuit to allow normal distributor and engine functions and said second switch of said remote receiver being arranged in said secondary circuit and operative when closed to complete said secondary circuit to activate said electrical lock to its secondary disengaged position; whereby, activation of said remote receiver by said remote transmitter simultaneously and automatically moves said first switch from said closed position to an open position disabling said primary circuit incapacitating said distributor and said engine and moves said second switch from said closed position to an open position disabling said secondary circuit causing said electrical lock means to automatically move from its secondary disengaged position into its primary engaged position locking said hood closed and securing said remote receiver within said engine compartment.

10. The device of claim 9 including a second remote receiver having a normally open first switch arranged in said primary circuit, a normally open second switch arranged in said secondary circuit and a second remote transmitter operative to cause said remote transmitter to simultaneously reverse positions of said switches; whereby, should said first remote receiver become disabled, with said anti-theft device in its active position, first and second switches of said second remote receiver may be closed to restore said primary circuit and said secondary circuit.

11. The device of claim 9 wherein said motor vehicle includes a starter, said starter being controlled by said primary circuit; whereby, activation of said remote receiver to open said first switch deactivates said primary circuit which disables said starter.

12. The device according to claim 9 wherein said electrical lock means comprises a pair of solenoids, each said solenoid having a core, said cores being in a withdrawn position when said solenoids are activated and being in an extended locking position when said solenoids are deactivated.

13. The device of claim 12 wherein said solenoids are mounted with said cores in position to engage opposite side edges of said hood.

14. The device of claim 9 wherein said power source includes a DC battery, a third circuit, having positive and negative poles connected with negative and positive poles of said battery, said poles of said third circuit being mounted on an exterior surface of said vehicle.

15. The device of claim 14 wherein said poles of said third circuit are mounted in a wheel well.

* * * * *